United States Patent [19]

Takahashi et al.

[11] Patent Number: 4,971,359
[45] Date of Patent: Nov. 20, 1990

[54] CENTER PILLAR STRUCTURE FOR A VEHICLE

[75] Inventors: Ichiro Takahashi, Utsunomiya; Masayuki Kakizaki, Haga; Haruo Matsushima, Utsunomiya, all of Japan

[73] Assignee: Honda Giken Kogyo Kabushiki Kaisha, Tokyo, Japan

[21] Appl. No.: 430,460

[22] Filed: Nov. 2, 1989

[30] Foreign Application Priority Data

Nov. 8, 1988 [JP] Japan .................. 63-280472

[51] Int. Cl.⁵ ............................................. B60R 22/20
[52] U.S. Cl. .................................. 280/808; 296/30; 296/203
[58] Field of Search .................. 296/30, 203, 202; 280/801, 808

[56] References Cited

U.S. PATENT DOCUMENTS

| | | | |
|---|---|---|---|
| 4,579,368 | 4/1986 | Kawade et al. | 280/808 |
| 4,610,464 | 9/1986 | Yasumatsu et al. | 280/808 |
| 4,763,925 | 8/1988 | Onoe et al. | 296/30 |
| 4,861,071 | 8/1989 | Takada | 280/808 |
| 4,872,704 | 10/1989 | Biller et al. | 280/808 |

FOREIGN PATENT DOCUMENTS 49572 4/1982 European Pat. Off. ............ 280/801

Primary Examiner—Margaret A. Focarino
Assistant Examiner—Gary C. Hoge
Attorney, Agent, or Firm—Armstrong, Nikaido, Marmelstein, Kubovcik & Murray

[57] ABSTRACT

The present invention relates to a center pillar designed for a vehicle. According to the invention, an anchor rail, supporting a seat belt anchor in a vertically movable manner, is fixedly provided on a center pillar of a vehicle. A reinforcing frame, containing the anchor rail therein, is fixedly mounted on an inner panel of the center pillar to which the anchor rail is attached. The reinforcing frame has a window facing the anchor rail. In another embodiment, the anchor rail is attached to a rail bracket. The rail bracket is fixedly mounted within the inner panel of the center pillar. A window in the interior side surface of the inner panel faces the anchor rail. In this embodiment, the center pillar is reinforced by the rail bracket.

2 Claims, 8 Drawing Sheets

CENTER PILLAR STRUCTURE FOR A VEHICLE

FIELD OF THE INVENTION

The present invention relates to a center pillar structure for a vehicle.

BACKGROUND OF THE INVENTION

A known type of center pillar structure for a vehicle is shown in FIG. 8, in which an anchor rail a, supporting a seat belt anchor in a vertically movable manner, is fixedly mounted on an interior surface of an inner panel c of a center pillar b.

In the above prior art structure, the following problems are encountered: The size of the center pillar b in a widthwise direction of the vehicle cannot be increased very much, because the anchor rail a is mounted on the interior surface of the inner panel c. Therefore, to assure the rigidity of the center pillar b, the size of the center pillar b in a lengthwise direction of the vehicle must be increased. Eventually, the center pillar b may be thickened and hence, with a sashless type of door, the center pillar mostly appears externally, which results in the vehicle having an injured appearance.

SUMMARY OF THE INVENTION

It is an object of the present invention to provide a center pillar designed so that the thickness thereof can be reduced without reduction of its rigidity.

To achieve the above object, according to the invention, there is provided a center pillar structure of a vehicle in which an anchor rail, supporting a seat belt anchor in a vertically movable manner, is fixedly provided on a center pillar of a vehicle. A reinforcing frame, containing the anchor rail therein, is fixedly mounted on an inner panel of the center pillar to which the anchor rail is attached. The reinforcing frame has a window facing the anchor rail. In this embodiment, since the reinforcing frame containing the anchor rail is fixedly mounted on the inner panel, the rigidity of the center pillar can be enhanced. In addition, the size of the center pillar in the widthwise direction of the vehicle, including the anchor rail, can be the same as in the prior art, while the size of the center pillar in the lengthwise direction of the vehicle can be reduced.

In addition, according to another embodiment of the invention, there is provided a center pillar structure for a vehicle, in which an anchor rail, supporting a seat belt anchor in a vertically movable manner, is fixedly provided on a center pillar of a vehicle. A rail bracket, to which the anchor rail is attached, is fixedly mounted within an inner panel of the center pillar. The inner panel has in the interior side surface thereof a window facing the anchor rail. In the second embodiment, since the rail bracket, to which the anchor rail is attached, is fixedly mounted within the inner panel, the center pillar is reinforced by the rail bracket, so that the rigidity thereof can be improved. The size of the center pillar in the lengthwise direction of the vehicle can be reduced, while there is no increase in size in the widthwise direction of the vehicle.

It should be noted that the window in the reinforcing frame and the window in the inner panel function as an opening for mounting the anchor rail and as an opening for sliding movement of the seat belt anchor, respectively.

DESCRIPTION OF THE PREFERRED EMBODIMENTS

Figure 1:
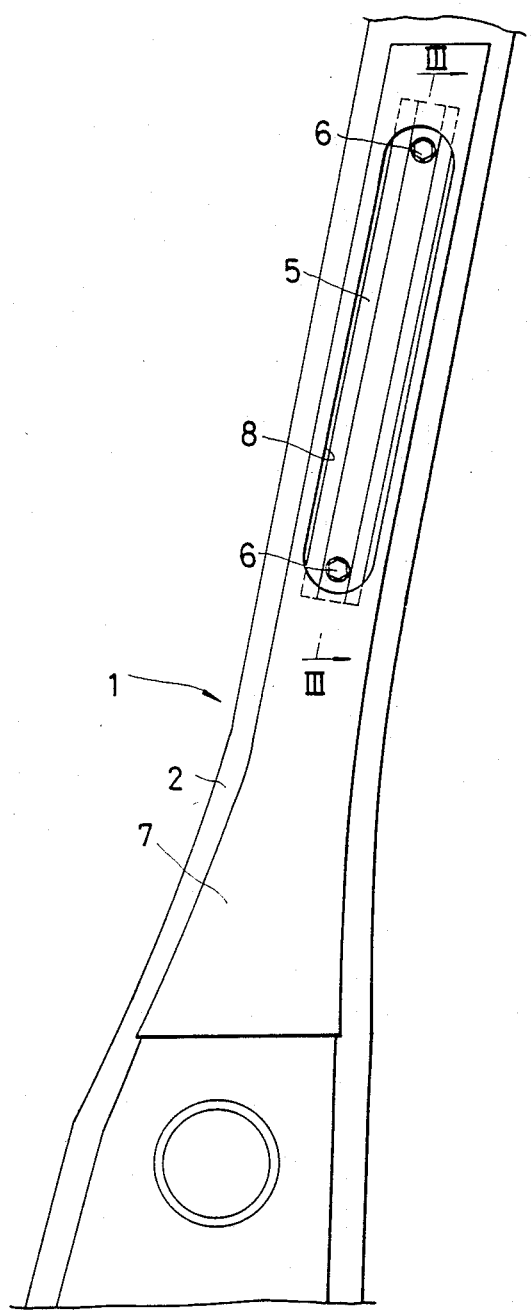
FIG. 1 is a front view of one embodiment of a center pillar according to the present invention.
Figure 2:
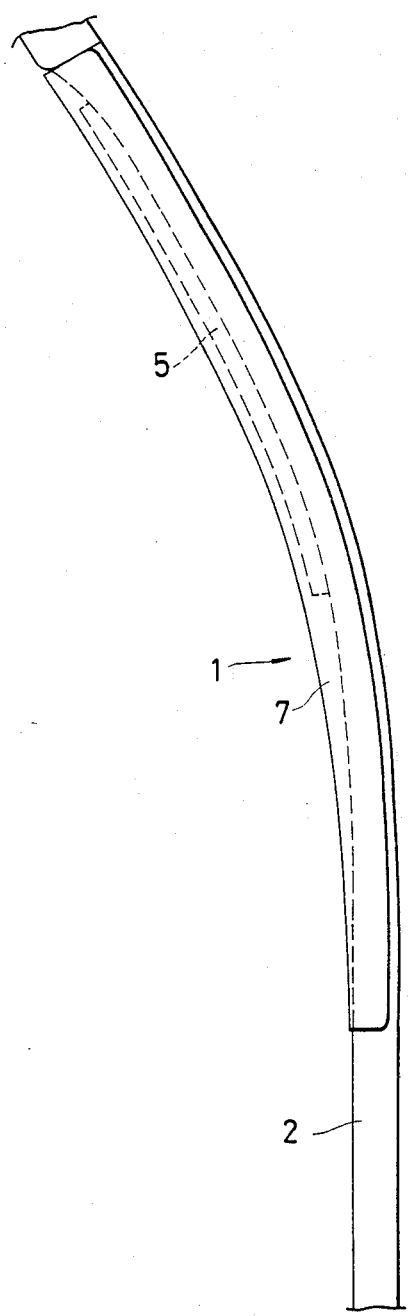
FIG. 2 is a right side view thereof.

FIGS. 1 to 4 show a center pillar 1, and an inner panel 2 of the center pillar. A reinforcing plate 3, having nuts 3a, 3a fixed thereto at two upper and lower places thereof, is fixedly mounted on an exterior surface of the inner panel 2. An anchor rail 5, for supporting a seat belt anchor 4 in a vertically movable manner, is bolted by bolts 6 on an interior surface of the inner panel. A reinforcing frame 7 is fixedly mounted on the inner panel 2 to contain the anchor rail 5 therein. The reinforcing frame 7 has a window 8 in a portion facing the anchor rail 5.

In the illustrated embodiment, the window 8 is sized so that the anchor rail 5 can be fixed to the inner panel 2 through the window 8. Edges on opposite sides of the window 8, in a lengthwise direction of the vehicle, are folded towards an exterior side of the vehicle to increase the rigidity of the center pillar 1.

Figure 3:
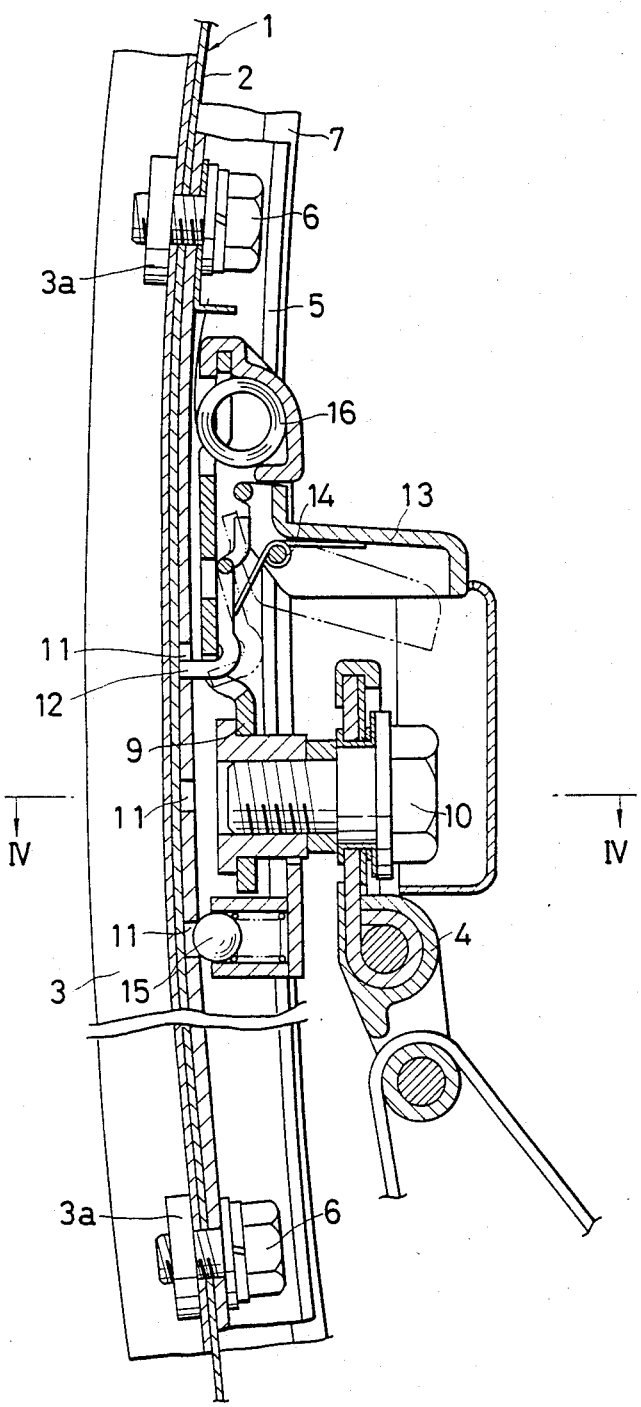
FIG. 3 is an enlarged sectional side view taken along the line III—III in FIG. 1, with a seat belt anchor mounted on an anchor rail.
Figure 4:
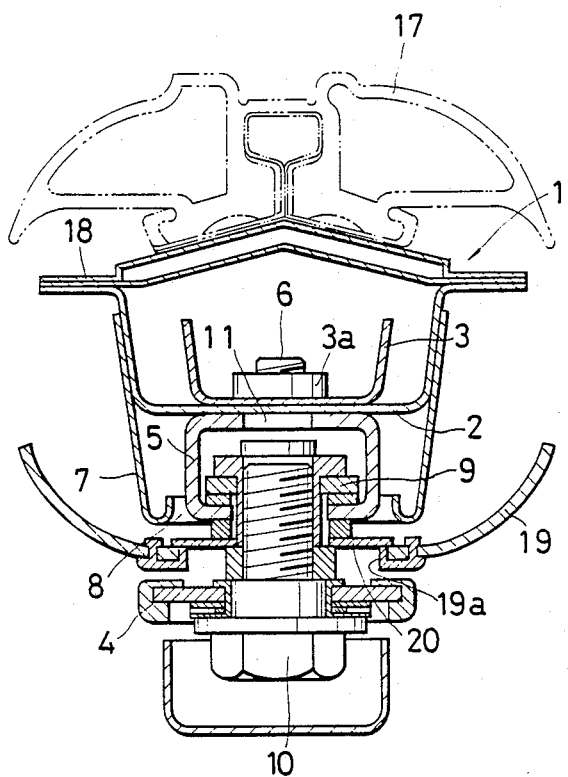
FIG. 4 is a sectional plan view taken along the line IV—IV in FIG. 3.

As shown clearly in FIG. 3, the seat belt anchor 4 is fixed by a bolt 10 to a slider 9 slidably inserted in the anchor rail 5. A plurality of engaging holes 11 are equally spaced apart in the lengthwise direction in the anchor rail 5. The slider 9 is provided with a) a lock claw 12, to engage the engaging hole 11, and b) an operating arm 13 engaged with a tail end of the lock claw 12 to operate the lock claw 12 in a disengaging direction. A single common spring 14 biases the lock claw 12 in a clockwise direction to engage it with the engaging hole 11. The spring 14 also biases the operating arm 13 in a counterclockwise direction. Thus, by operating the operating arm 13 in the clockwise direction, i.e., toward a position shown by a phantom line, against the force of the spring 14, the upper portion of the lock claw 12 is pushed by the operating arm 13 so that the lock claw 12 is moved in the counterclockwise direction, i.e., toward a position shown by a phantom line, against the force of the spring 14 and is disengaged out of the engaging hole 11. In this state, the position of the seat belt anchor 4 can be vertically adjusted through the slider 9.

In FIGS. 1-4, numeral 15 is a click ball; numeral 16 is a balancing spring; numeral 17 is a seal affixed on an exterior surface of an outer panel 18 of the center pillar 1; numeral 19 is an interior member for covering the center pillar; and numeral 20 is a shield member for shielding the window 19a in the interior member 19 which faces the anchor rail 5. The shield member 20 is attached to the slider 9 and is moved with the slider 9.

Figure 5:
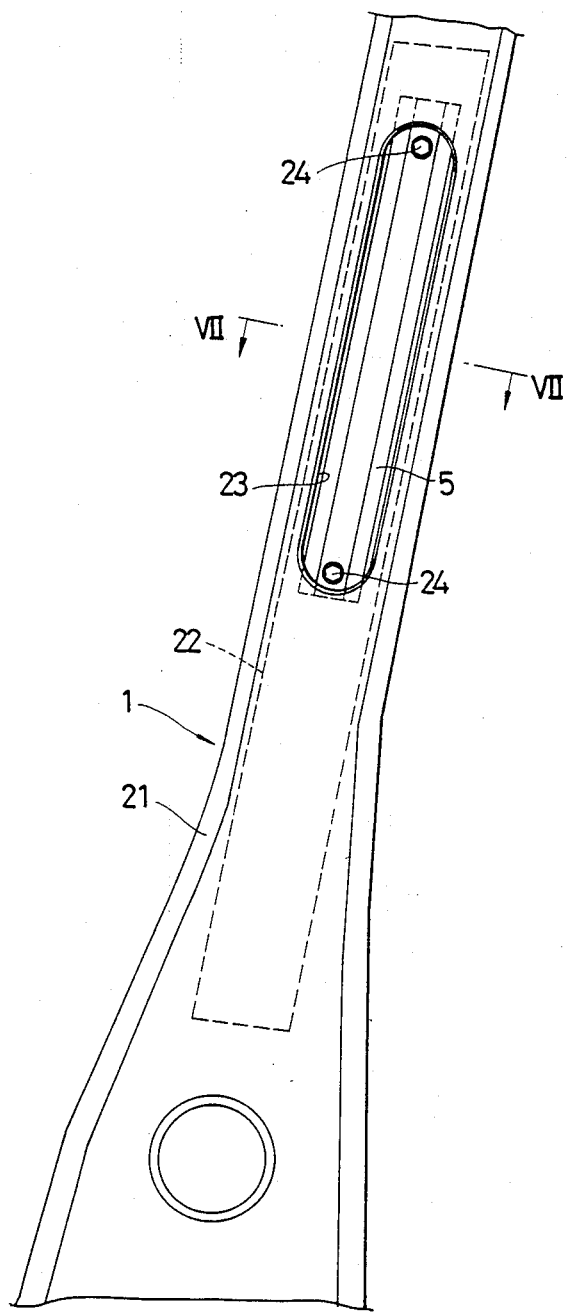
FIG. 5 is a front view of the center pillar showing another embodiment of the present invention.
Figure 6:
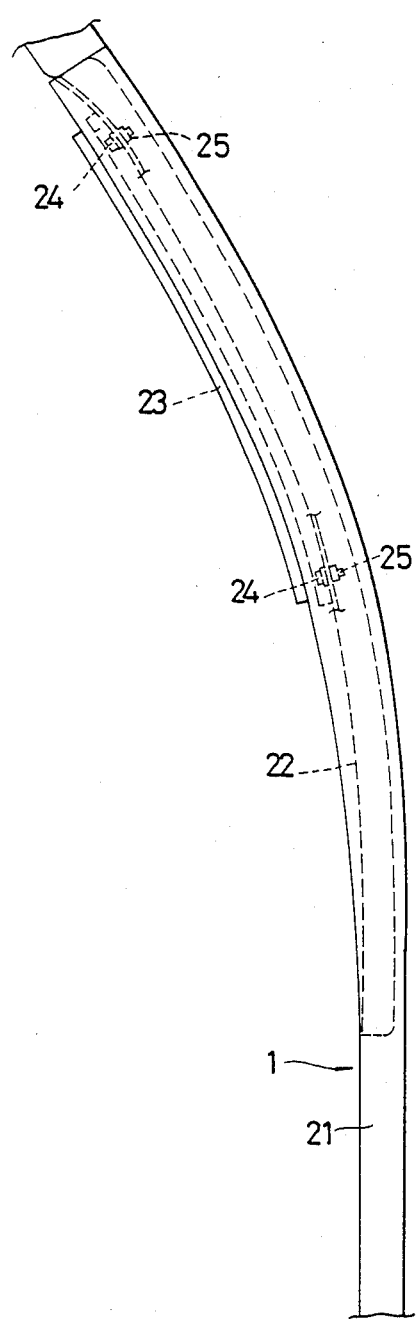
FIG. 6 is a right side view thereof.
Figure 7:
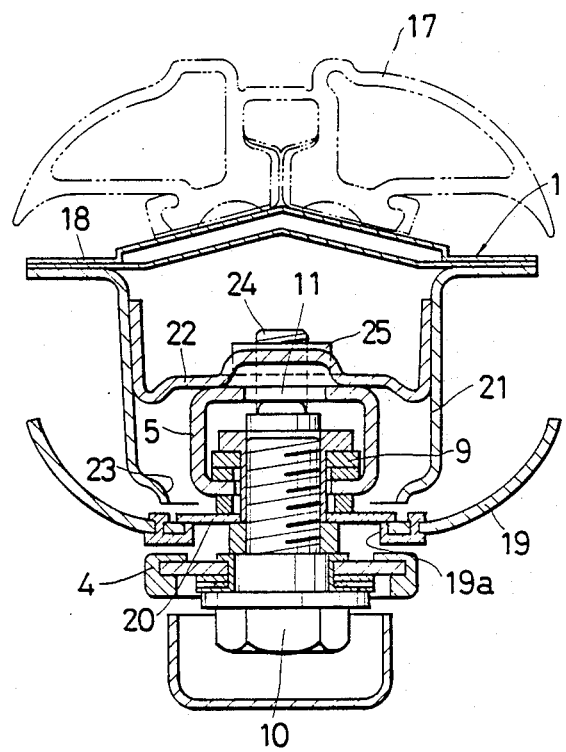
FIG. 7 is an enlarged sectional side view taken along the line VII—VII in FIG. 5, with a seat belt anchor mounted on an anchor rail.
Figure 8:
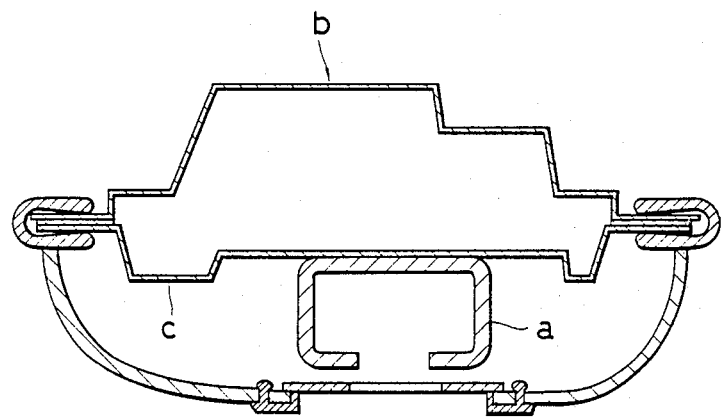
FIG. 8 is a sectional plan view of a center pillar showing a conventional example.

FIGS. 5 to 7 illustrate another embodiment, wherein a rail bracket 22, to which the anchor rail 5 is attached, is fixedly mounted within the inner panel 21 of the center pillar 1. A window 23 is opened in an interior surface of the inner panel 21.

Nuts 25, 25 are fixedly mounted at vertically opposite portions on an exterior surface of the rail bracket 22 so that the anchor rail 5 is bolted by bolts 24 to the rail bracket 22 through the window 23.

In the foregoing first embodiment, in order to increase the rigidity of the portion of the inner panel 2 to which the anchor rail 5 is mounted, the entire length of the inner panel 2 must be increased in thickness, which results in an increase in weight. Therefore in the first embodiment, the anchor rail 5 has been attached to the inner panel 2 through the reinforcing plate 3 to attain a reduction in weight. On the other hand, in the second embodiment, it is only required to increase the thickness of the rail bracket 22, and the reinforcing plate 3 is dispensed with, leading to a decrease in the number of parts, which is convenient.

As discussed above, according to the invention, the center pillar can be made thinner without reducing the rigidity of the center pillar which also leads to an improved external appearance of the vehicle.

It is apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A center pillar structure for a vehicle comprising:
a center pillar of the vehicle, said center pillar having an inner panel;
a seat belt anchor;
anchor rail supporting said seat belt anchor in a vertically movable manner, said anchor rail being fixedly provided on said inner panel; and
a reinforcing frame, containing said anchor rail therein, fixedly mounted on said inner panel of the center pillar, said reinforcing frame having a window facing the anchor rail.

2. A center pillar structure for a vehicle comprising:
a center pillar of said vehicle, said center pillar having an inner panel, said inner panel having a window in an interior side surface thereof;
a seat belt anchor;
an anchor rail supporting said seat belt anchor in a vertically movable manner; and
a rail bracket, to which said anchor rail is attached, is fixedly mounted within said inner panel of the center pillar at a distance from said window equal to a thickness of said anchor rail, said window of said inner panel facing the anchor rail.

* * * * *